April 1, 1958     J. E. FIELDEN     2,829,254
ELECTRICAL MEASURING APPARATUS
Filed May 5, 1955
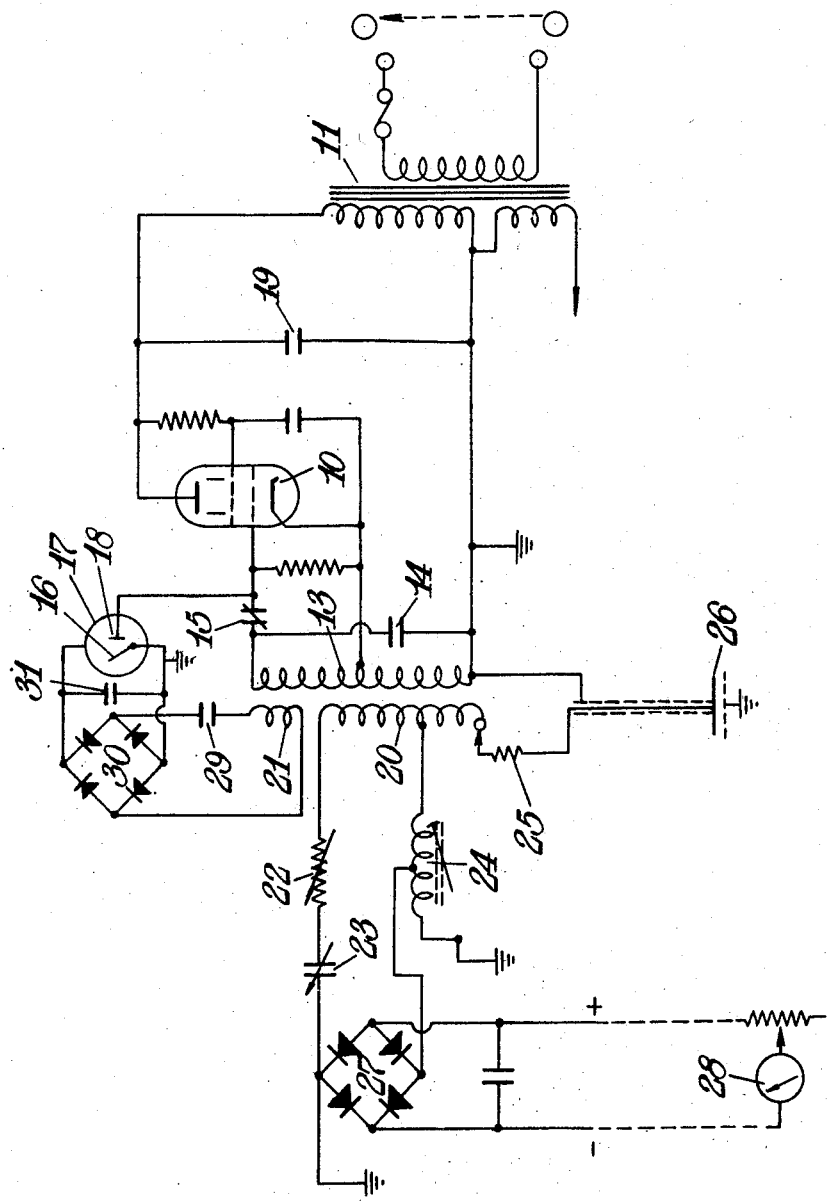

United States Patent Office 2,829,254
Patented Apr. 1, 1958

2,829,254

ELECTRICAL MEASURING APPARATUS

John Ernest Fielden, Wythenshawe, Manchester, England, assignor to Fielden Electronics Limited, Manchester, England, a British company Application May 5, 1955, Serial No. 506,307

2 Claims. (Cl. 250—36)

This invention relates to electrical measuring apparatus of the kind in which electronically generated oscillations are used for measuring purposes, such as for example level indicating apparatus where a probe is one element of a bridge supplied with oscillations, and the out of balance voltage of the bridge is measured as a meter deflection.

The object of the invention is to provide a means of stabilising the electronically generated oscillations against fluctuations in the mains supply voltage and/or frequency, and against variations within the oscillator such as ageing of valves.

According to the invention I provide stabilising means in the oscillator, comprising a capacity connected to the oscillator which is varied to reduce the amplitude of oscillation when the high frequency voltage exceeds a desired value.

Preferably a small high frequency voltage is obtained from a winding on a transformer coupling the oscillator with the measuring circuit, and this voltage is rectified and applied to a meter, the meter having a vane adapted to be deflected by its moving coil, capacitatively associated with a fixed vane connected to the oscillator grid circuit, whereby when the meter is deflected so that the vanes approach one another, and the capacity between them increases, the amplitude of oscillation is reduced.

A condition of equilibrium is reached at a certain meter deflection, and this is automatically maintained in spite of changes in the circuit such as fluctuations in mains voltage or frequency or ageing of the oscillator valve.

The accompanying drawing shows diagrammatically and by way of example the circuit arrangement of a level indicating apparatus incorporating an oscillator arranged in accordance with the invention.

The oscillator includes a thermionic valve 10, the anode of which is supplied with alternating current at mains frequency by a transformer 11. A coil 13 and condenser 14 form a radio-frequency tuned circuit and a condenser 15 and the capacity between an earthed vane 16 attached to the moving coil of a meter 17 and a fixed vane 18 situated in the arc of movement of the vane 16 act as a potential divider for supplying a suitable voltage to the valve grid. A condenser 19 couples the valve anode to the lower end of the coil 13.

The coil 13 is inductively coupled with two coils 20, 21. The circuit of one section of the coil 20 is completed via variable resistor 22, and capacitor 23 in series, and coil 24, whilst the circuit of the other section of the coil 20 is completed through resistor 25, condenser 26, one side of which is formed by a probe in a container where the level of a material is to be measured, and coil 24. The phasing of the sections of coil 20 is so arranged that the currents passing through the common element of the two circuits, namely coil 24, are in anti-phase, so that the flux generated by coil 24 is proportional to the difference between the currents flowing in the two circuits. By adjustment of condenser 23 and resistor 22, the two currents are made equal when the container is empty.

When the capacity of the condenser 26 is changed by substance in the container, the current in that circuit is increased and exceeds the current in the other circuit causing a voltage to be developed across coil 24. This voltage is at radio frequency controlled by coil 13 and condenser 14 but it is modulated 100% by the rectified mains supply, the rectification having been done by valve 10. The modulated radio frequency signal is fed to a rectifier 27 the output of which can be read on an indicating meter 28, calibrated to indicate the extent to which the container is filled.

The coil 21 is connected through an impedance 29 to a rectifier 30. The output from the rectifier 30 is connected to the meter 17, condenser 31 being a low pass filter. When the moving coil of the meter 17 is energised, the vane 16 moves towards the fixed vane 18, thereby reducing the space between the two until eventually they are in contact.

Positive feed back is now dependent upon the relative capacities of condenser 15, together with the capacity between the fixed and moving vanes on the meter movement, in that a capacity potentiometer is formed across the coil 13 with the junction between the two elements connected to the valve grid.

When the valve is oscillating, energy is picked up on the coupling coil 21 and is rectified, and the rectified output is passed to the meter coil and hence causes the moving vane 16 to approach the fixed vane 18 with a consequent increase in capacity between the two vanes. With the increase of capacity there is an inverse reduction of impedance between the grid and earth and the grid potential moves towards that of earth. It will now be noted that an external loop, including negative feed back, has been formed in that as the oscillator output increases, so the coupling is reduced to counteract this increase and a position of stability will be found whereby the coupling provided by a particular amplitude of oscillation is the requisite coupling for that amplitude. If now some extraneous change, such as an increase of supply voltage is met, the increase of amplitude that would normally follow is used to supply further energy to the moving coil to make a further reduction in coupling and by having high sensitivity of negative feed back, which is obtained by close spacing of the vanes, the deviation from the previous amplitude is so small as to be insignificant. Similarly if any change in the circuit parameters occurs which would normally lead to a change in the level of oscillation the feed back loop reduces this change of level to an insignificant amount by re-adjusting the coupling by variation of the spacing between the two vanes.

What I claim is:

1. An electrical measuring apparatus incorporating a measuring circuit and an electronic oscillator, and having means for stabilizing the amplitude of the oscillatory current of the oscillator comprising a variable capacity arranged to vary the feed-back coupling of the oscillator, current-actuated means for varying the said capacity, a transformer coupling the oscillator with the measuring circuit, and a winding on the transformer for applying to said current-actuated means a current related to the oscillator output, for reducing the feed-back coupling if the oscillator output rises and vice versa.

2. An electrical measuring apparatus incorporating an electronic oscillator and means for stabilizing the oscillatory current of the oscillator comprising a measuring circuit, a transformer coupling the oscillator with the measuring circuit, a winding on said transformer for supplying a small high frequency control voltage, means for rectifying said voltage, a moving coil meter movement, connections applying the output of the rectifying means to said movement, an earthed vane adapted to be deflected by the moving coil, and a fixed vane capacitatively associated with the moving vane and connected to the oscillator grid circuit, whereby when the meter movement is deflected so that the vanes approach one another and the capacity between them increases, the amplitude of oscillation is reduced.

References Cited in the file of this patent

UNITED STATES PATENTS

| | | |
|---|---|---|
| 2,262,149 | Slonczewski | Nov. 11, 1941 |
| 2,589,991 | Clark | Mar. 18, 1952 |
| 2,756,314 | Blok | July 24, 1956 |
| 2,773,192 | Blok et al. | Dec. 4, 1956 |